United States Patent
Sugiyama et al.

(10) Patent No.: US 10,788,185 B2
(45) Date of Patent: Sep. 29, 2020

(54) VEHICULAR LAMP SYSTEM CONFIGURED TO CHANGE THE EXTENT OF HIGH-LOW RATIO OF THE ILLUMINATION DISTRIBUTIONS

(71) Applicant: Stanley Electric Co., Ltd., Tokyo (JP)

(72) Inventors: Takashi Sugiyama, Tokyo (JP); Shinya Kogure, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/205,061

(22) Filed: Nov. 29, 2018

(65) Prior Publication Data

US 2019/0219242 A1    Jul. 18, 2019

(30) Foreign Application Priority Data

Dec. 7, 2017 (JP) .................................. 2017-235066
Feb. 14, 2018 (JP) ................................ 2018-024217

(51) Int. Cl.
*F21S 41/64* (2018.01)
*F21S 41/20* (2018.01)
(Continued)

(52) U.S. Cl.
CPC ............. *F21S 41/645* (2018.01); *F21S 41/25* (2018.01); *F21S 41/285* (2018.01); *F21S 45/10* (2018.01);
(Continued)

(58) Field of Classification Search
CPC ...................................................... F21S 41/645
See application file for complete search history.

(56) References Cited

U.S. PATENT DOCUMENTS 6,155,698 A    12/2000   Yoon et al.
7,367,693 B2 *   5/2008   Tsukamoto ............. F21S 41/17
                                                                             362/308
(Continued)

FOREIGN PATENT DOCUMENTS

DE   10 2013 108 811 A1   2/2015
DE   10 2015 109 837 A1   12/2016
(Continued)

OTHER PUBLICATIONS

The extended European Search Report for the related European Patent Application No. 18210302.8 dated Apr. 8, 2019.

*Primary Examiner* — Evan P Dzierzynski
*Assistant Examiner* — Keith G. Delahoussaye
(74) *Attorney, Agent, or Firm* — Kenealy Vaidya LLP

(57) ABSTRACT

To form a light distribution pattern having a light illuminance distribution desirable for a vehicular lamp while reducing the temperature bias of a liquid crystal element. A vehicular lamp system capable of variably setting an irradiation pattern of light irradiated to the surroundings of an own vehicle including a light source, a first optical system for making uniform the intensity distribution of light from the light source, a liquid crystal element for modulating light emitted from the first optical system to form an image, a driving unit for driving the liquid crystal element, and a second optical system for projecting the image formed by the liquid crystal element, wherein the vehicular lamp system has a central axis in which the image incident on the plane including the central axis is projected at a relatively large enlargement ratio as it is farther from the central axis.

18 Claims, 7 Drawing Sheets

(51) Int. Cl.
  *G03B 21/26* (2006.01)
  *G03B 29/00* (2006.01)
  *G03B 21/00* (2006.01)
  *F21S 41/25* (2018.01)
  *F21S 45/10* (2018.01)
  *G02F 1/1335* (2006.01)

(52) U.S. Cl.
  CPC ........... *G03B 21/006* (2013.01); *G03B 21/26* (2013.01); *G03B 29/00* (2013.01); *G02F 1/133528* (2013.01)

(56) References Cited

U.S. PATENT DOCUMENTS

2014/0340588 A1* 11/2014 Akiyama ............ H04N 9/3167
  349/9
2017/0144591 A1* 5/2017 Yatsu .................... F21S 41/125

FOREIGN PATENT DOCUMENTS

| DE | 102015109837 A1 | * | 12/2016 | ............ B60Q 1/085 |
|---|---|---|---|---|
| EP | 0563874 A1 | | 10/1993 | |
| JP | H06191346 A | | 7/1994 | |
| JP | H07108873 A | | 4/1995 | |
| JP | H08-289237 A | | 11/1996 | |
| JP | 2005-258469 A | | 9/2005 | |
| JP | 2005258469 A | * | 9/2005 | |
| JP | 2010-95048 A | | 4/2010 | |
| JP | 2014-144725 A | | 8/2014 | |

* cited by examiner

VEHICULAR LAMP SYSTEM CONFIGURED TO CHANGE THE EXTENT OF HIGH-LOW RATIO OF THE ILLUMINATION DISTRIBUTIONS

BACKGROUND OF THE INVENTION

Field of the Invention

The present invention relates to a technique for selectively irradiating surroundings of an own vehicle with a vehicular lamp.

Description of the Background Art

There is known a vehicular lamp system that selectively irradiates light by setting the irradiation range and the non-irradiation range of light from the headlamp unit of the own vehicle according to the position of the oncoming vehicle or the preceding vehicle (hereinafter referred to as "forward vehicle") existing in front of the own vehicle. A prior art related to such a vehicular lamp system is disclosed in, for example, Japanese Unexamined Patent Application Publication No. H07-108873. In this type of a vehicular lamp system, a camera is installed at a predetermined position in front of the own vehicle (for example, the upper center of the windshield), and the position of the vehicle body, the taillight, or the headlamp of the forward vehicle captured by the camera is detected by image processing. Then, light distribution control is performed so that the detected portion of the forward vehicle is not irradiated with the light from the headlamp unit of the own vehicle. Further, it is known to use a liquid crystal element to control the irradiation range and the non-irradiation range of light (for example, refer to Japanese Unexamined Patent Application Publication No. H06-191346).

Now, regarding light irradiated to the space in front of the own vehicle (hereinafter often referred to as "the front space of the vehicle"), it is generally desired that the illuminance distribution is formed so that the illuminance at the center (the front center of the vehicle) is set higher. This is for further enhancing the visibility of the front center of the vehicle. Therefore, conventionally, the intensity distribution of light is made higher at the center as described above at the time when light is made incident into the liquid crystal element, then an image corresponding to a desired light distribution pattern is formed by the liquid crystal element, and the image is then uniformly enlarged and projected to the front space of the vehicle.

However, in this case, the intensity of the incident light largely differs depending on the position of the liquid crystal element. Since the light intensity from the light source used in a vehicular lamp is relatively high, when the temperature of the liquid crystal element rises due to heat generated by this light, a temperature distribution corresponding to the light intensity distribution inevitably occurs.

When such a temperature distribution occurs, dispersion occurs in the transmittance change of the liquid crystal element and a desirable light distribution pattern becomes unobtainable in some cases.

In a specific aspect, it is an object of the present invention to form a light distribution pattern having an illuminance distribution of light desirable for a vehicular lamp while reducing the temperature bias of the liquid crystal element.

SUMMARY OF THE INVENTION

A vehicular lamp system according to one aspect of the present invention is (a) a vehicular lamp system capable of variably setting an irradiation pattern of light irradiated to the surroundings of an own vehicle including (b) a light source, (c) a first optical system for making uniform the intensity distribution of light from the light source, (d) a liquid crystal element for modulating light emitted from the first optical system to form an image, (e) a driving part for driving the liquid crystal element, and (f) a second optical system for projecting the image formed by the liquid crystal element, wherein (g) the second optical system has a central axis in which the image incident on a plane including the central axis is projected at a relatively large enlargement ratio as it is farther from the central axis.

Here, the term "making uniform" used with respect to the intensity distribution of light in this specification means to flatten the intensity distribution of light (for example, the illuminance distribution) before entering the first optical system and/or to reduce the intensity difference in the intensity distribution of light when flattening the intensity distribution of light is not feasible.

According to the above configuration, it is possible to form a light distribution pattern having an illuminance distribution of light desirable for a vehicular lamp while reducing the temperature bias of the liquid crystal element.

DESCRIPTION OF THE PREFERRED EMBODIMENTS

Figure 1:
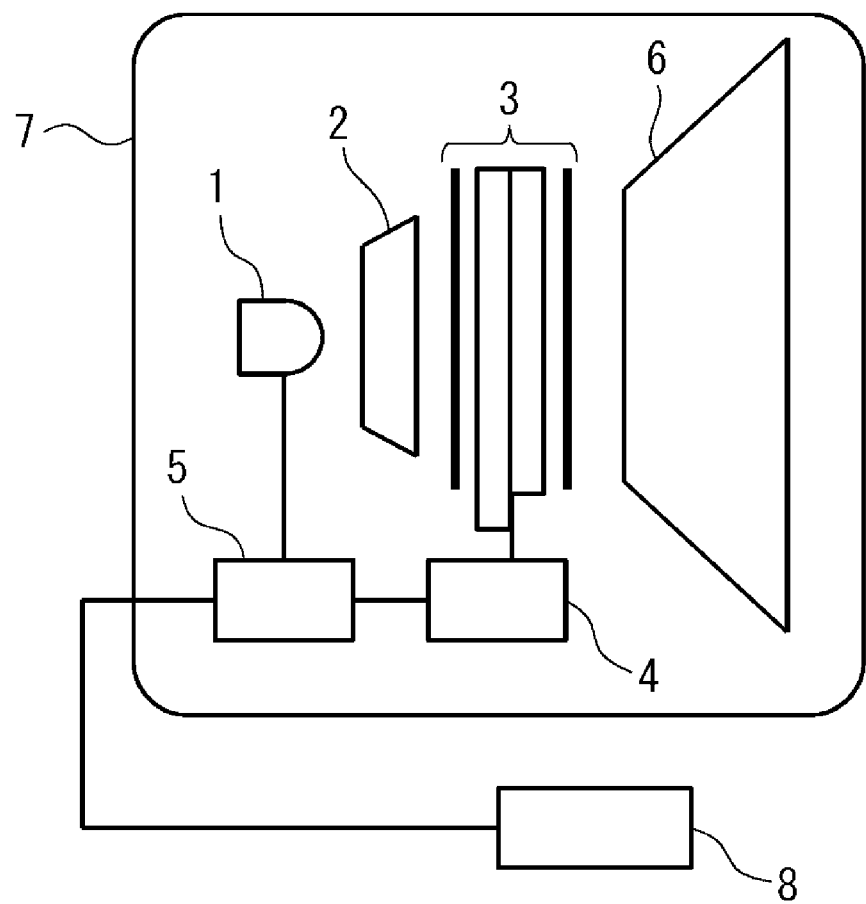
FIG. 1 is a diagram showing a configuration of a vehicular lamp system according to one embodiment.

FIG. 1 is a diagram showing a configuration of a vehicular lamp system according to one embodiment. The vehicular lamp system shown in FIG. 1 is configured to include a light source 1, an incident optical system 2, a liquid crystal element 3, a driving circuit 4, a control part 5, a projection optical system 6, and a camera 8. Each component other than the camera 8 is housed in a housing 7, for example. In this vehicle lamp system, a predetermined range including the position of a forward vehicle or the like is set to a non-irradiation range corresponding to the position of the forward vehicle or a pedestrian and the like present surrounding the own vehicle, and the range other than this predetermined range is set to a light irradiation range for selectively irradiating light.

The light source 1 includes, for example, a white light LED configured by combining a yellow phosphor in a light emitting element (LED) that emits blue light. Here, instead of the above-stated LED, light source commonly used in a lamp unit for vehicles such as a laser, a light bulb or a discharge lamps can be used for the light source 1. The on/off state of the light source 1 is controlled by the control part 5.

The incident optical system 2 converts light emitted from the light source 1 into substantially parallel light, and for example, a convex lens can be used in the system. In this case, it is possible to create parallel light by arranging the light source 1 near the focal point of the convex lens. Here, a lens, a reflecting mirror, or a combination thereof can be used in the incident optical system 2.

The liquid crystal element 3 has, for example, a plurality of individually controllable pixel regions (light modulating regions), and the transmittance of each pixel region is variably set according to the magnitude of the voltage applied to the liquid crystal layer provided by the driving circuit 4. By transmitting light from the light source 1 to the liquid crystal element 3, an image having brightness and darkness corresponding to the light irradiation range and the non-irradiation range described above is formed. The liquid crystal element 3 of the present embodiment is provided with a vertical alignment type liquid crystal layer and a pair of polarizers arranged in crossed Nicol arrangement. The liquid crystal element 3 is set in a state in which the light transmittance is extremely low (light shielding state) when the voltage to the liquid crystal layer is not applied (or a voltage is equal to or lower than the threshold value) and is set in a state in which the light transmittance is relatively high (transmission state) when the voltage is applied to the liquid crystal layer. That is, the liquid crystal element 3 of the present embodiment is a so-called normally closed type (normally black mode type) liquid crystal element.

The driving circuit (the driving part) 4 supplies a driving voltage to the liquid crystal element 3 based on the control signal supplied from the control part 5, thereby individually controlling the alignment state of the liquid crystal layer in each pixel region of the liquid crystal element 3.

The control part (light distribution control part) 5 detects the position of the forward vehicle or the like by performing image processing based on the image obtained by the camera 8 photographing the front space of the vehicle. The control part 5 then sets a light distribution pattern where the area of the position of the detected forward vehicle or the like is defined as the non-irradiation range and the other area is defined as the irradiation range. The control part 5 then generates a control signal for forming an image corresponding to the light distribution pattern and supplies it to the driving circuit 4. The control part 5 carries out a predetermined operation program in a computer system comprising a CPU, ROM, RAM, and the like, for example.

The projection optical system 6 enlarges the image formed by the light transmitted through the liquid crystal element 3 (the image having light and dark portions each corresponding to the light irradiation range and the non-irradiation range) so as to provide light distribution suited for a headlight and projects the image forward of the own vehicle, and a suitably designed lens is used in the system to achieve its purpose. Here, a lens, a reflecting mirror, or a combination thereof can be used in the projection optical system 6.

The camera 8 is for photographing the front of its own vehicle and outputting its image (information), and is installed at a predetermined position (for example, the upper portion of the front windshield) inside the vehicle. Here, note that if the own vehicle is equipped with a camera for other purposes (for example, an automatic braking system or the like), the camera may be shared. Further, if such sharing is not implemented, the camera 8 may be provided inside the housing 7.

Figure 2:
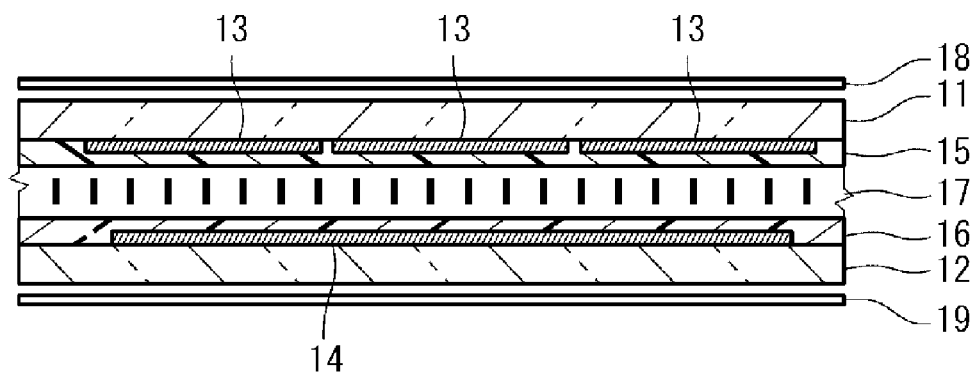
FIG. 2 is a schematic cross-sectional view showing a configuration example of a liquid crystal element.

FIG. 2 is a schematic cross-sectional view showing a configuration example of a liquid crystal element. The liquid crystal element 3 shown in FIG. 2 is configured to include an upper substrate 11 and a lower substrate 12 disposed facing each other, a plurality of first electrodes 13 provided to the upper substrate 11, a plurality of second electrodes 14 provided to the lower substrate 12, a first alignment film 15 provided to the upper substrate 11, a second alignment film 16 provided to the lower substrate 12, a liquid crystal layer 17 disposed between the upper substrate 11 and the lower substrate 12, and a pair of polarizers 18 and 19.

Each of the upper substrate 11 and the lower substrate 12 is a rectangular substrate when viewed in plane, disposed facing each other. For each substrate, a transparent substrate, such as a glass substrate, plastic substrate, or the like may be used, for example. A plurality of spacers is dispersed uniformly and arranged between the upper substrate 11 and the lower substrate 12, for example, and as a result of these spacers, a predetermined gap (approximately a few nm, for example) is maintained between the two substrates.

Each of the first electrodes 13 is provided on one surface side of the upper substrate 11 and extend in a direction perpendicular to the plane of the figure and a plurality of the first electrodes 13 is arranged in the left-right direction of the plane, comprising a plurality of conductive films, for example. Each of the second electrodes 14 is provided on one surface side of the lower substrate 12 and extend in the left-right direction of the plane of the figure and a plurality of the second electrodes 14 is arranged in the direction perpendicular to the plane, comprising a plurality of conductive films, for example. Each region where each first electrode 13 and each second electrode 14 overlap each other constitute the aforementioned pixel region (light modulation region). Each electrode is configured, for example, by suitably patterning a transparent conductive film made of indium tin oxide (ITO) or the like. Although not shown in the figure, an insulating film may be provided on the upper surface of each of the electrodes.

A first alignment film 15 is provided to one surface side of the upper substrate 11 so as to cover the first electrode 13. A second alignment film 16 is provided to one surface side of the lower substrate 12 so as to cover the second electrode 14. The first and second alignment films 15, 16 use vertical alignment films for controlling the aligned state of the liquid crystal layer 17 in the vertical direction. On each of the alignment films, a uniaxial orientation process such as a rubbing process is performed, thereby achieving alignment regulation force to one direction. The alignment treatment directions of the respective alignment films is set so as to be staggered (anti-parallel), for example.

A liquid crystal layer 17 is provided between the upper substrate 11 and the lower substrate 12. In this embodiment, the liquid crystal layer 17 is configured using a liquid crystal material having fluidity with a dielectric constant anisotropy $\Delta\varepsilon$ being negative, and with no chiral material contained. The liquid crystal layer 17 of this embodiment is in a state where the alignment direction of liquid crystal molecules is inclined to one direction when no voltage is applied, and is substantially vertically aligned having a pretilt angle of 88° or more and less than 90° with respect to each substrate surface.

The pair of polarizers 18 and 19 are disposed so that the respective absorption axes are substantially perpendicular to each other, and the polarizers are disposed opposing each other with the upper substrate 11 and the lower substrate 12 interposed therebetween. In this embodiment, a normally closed mode is assumed, which is an operation mode in which light is shielded (transmittance is extremely low) when no voltage is applied to the liquid crystal layer 17.

The liquid crystal element 3 has a plurality of first electrodes each extending in the vertical direction and arranged in the left-right direction and a plurality of second electrodes each extending in the left-right direction and arranged in the vertical direction, when the substrate surface is viewed in a plan view, for example. There are 336 pixel regions, each of which is a region where each first electrode and each second electrode overlap in plan view, and these pixel regions are arranged in a matrix. In the present embodiment, the shape of each pixel region is all the same, and is configured in a square shape, for example. Each first electrode 13 and each second electrode 14 are connected to the driving circuit 4, and are driven in a simple matrix with a 1/7 duty, for example. Here, note that the liquid crystal element 3 is not limited to such a simple matrix type but may be a static type or an active matrix type having switching elements such as thin film transistors for each of the pixels.

Figure 3:
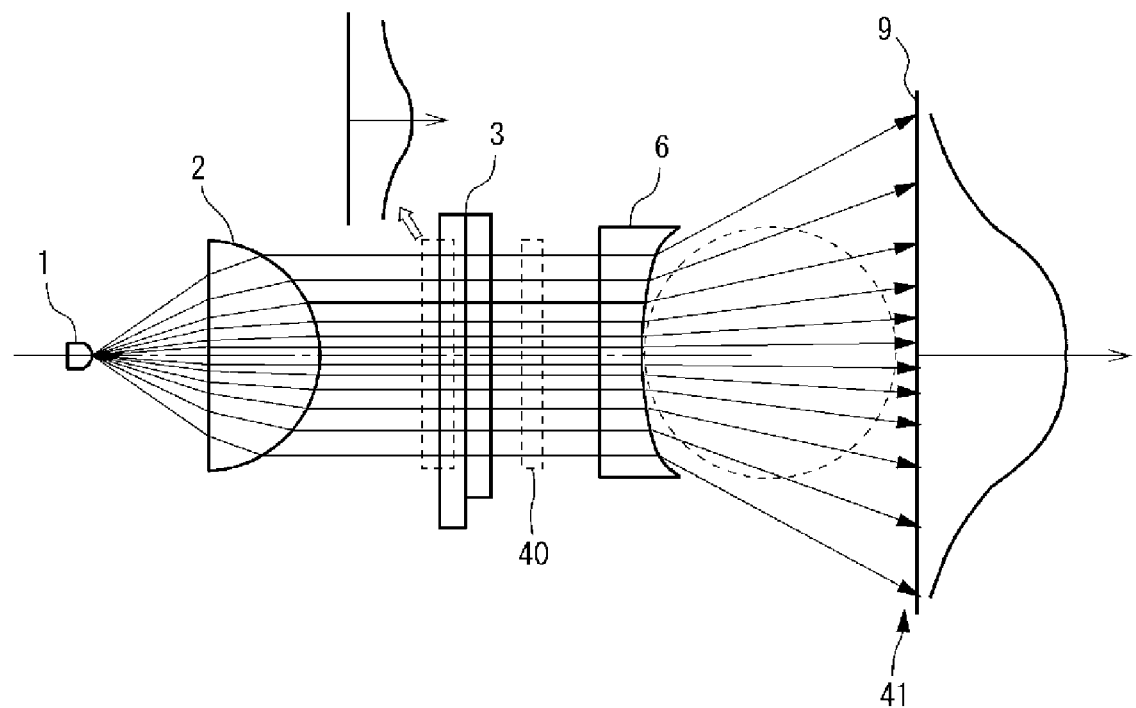
FIG. 3 is a plan view showing a configuration of a liquid crystal element and an optical system in a vehicular lamp system.

FIG. 3 is a plan view showing a configuration of a liquid crystal element and an optical system in a vehicular lamp system. Here, a plan view of the horizontal direction of the vehicle viewed from above of the vehicle is shown. In the figure, the right side corresponds to the front of the vehicle. Further, in the figure, the upper side corresponds to the left side of the irradiation direction and the lower side corresponds to the right side of the irradiation direction.

In the optical system shown in FIG. 3, the incident optical system 2 uses a single plane convex lens (plano-convex lens). The single plane convex lens is disposed so that the flat surface faces the light source 1. The light source 1 is arranged so that the light emission position substantially coincides with the vicinity of the focal point of the single plane convex lens. With such an arrangement, the light emitted while spreading from the light source 1 can be converted into parallel light and be made uniform. Light emitting from the light source 1 is made incident on the incident optical system 2, then the parallel light emitted from the single plane convex lens of the incident optical system 2 is incident on the liquid crystal element 3. As schematically shown in the figure, the illuminance distribution of the light incident on the liquid crystal element 3 becomes right-left symmetrical having a relatively high illuminance in the vicinity of the center (the part corresponding to the center position in front of the vehicle). However, the high-low difference of illuminance is smaller than that of the illuminance distribution of the light emitted from the light source 1 before being incident on the incident optical system 2, that is, the illuminance distribution becomes relatively flat and uniform. This reflects the light emitting characteristic of the light source 1 itself when a white LED is used as the light source 1 as described above, for example.

The projection optical system 6 uses a single plane concave lens (plano-concave lens), for example. The single plane concave lens is arranged so that the flat surface faces the liquid crystal element 3. The single plane concave lens in this embodiment has a lens shape in which the curvature of the curved surface (refractive surface) is relatively small in the vicinity of its central axis (the optical axis) and the curvature of the curved surface becomes relatively large as it is distant from the center and close to the peripheral portion. As a result, the light incident on the peripheral portion of the curved surface advances while being refracted away from the central axis. In the figure, for ease of understanding the curvature change on the curved surface of the single plane concave lens, as a comparison, a circle is indicated by a dotted line. Due to such a lens shape, the closer the unit area of light incident on the single plane concave lens is to the periphery portion of the single flat concave lens, the more the unit area of light is enlarged, and a relatively large area is irradiated on the virtual screen 9 assumed as the front space of the vehicle. On the contrary, since the refraction is smaller at the portion closer to the central axis of the single plane concave lens, with regard to the unit area of light incident on the single plane concave lens in the vicinity of the central axis, a relatively small area is irradiated on the virtual screen 9.

Due to such a relationship, the extent of height difference (high-low ratio) of the illuminance distribution of light on the virtual screen 9, as its illuminance distribution is schematically shown in the figure, is larger than that of the light incident on the liquid crystal element 3. Such illuminance distribution where light becomes relatively brighter as it is closer to the central axis is preferable as the illuminance distribution of the light irradiated to the front space of the vehicle. Here, In FIG. 3, the front to rear direction of the vehicle viewed from the upper side (of the vehicle) is shown in a plan view, and similar illuminance distribution may also be realized when the vehicle up-down direction is viewed from the side of the vehicle.

Figure 4:
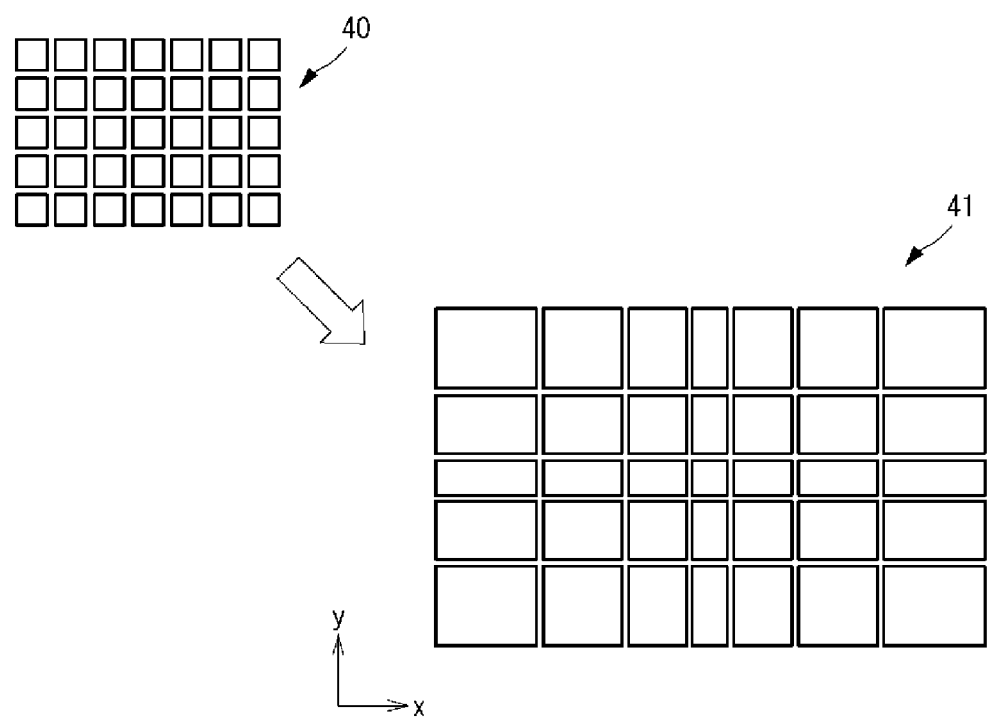
FIG. 4 is a diagram schematically showing a projection pattern by the projection optical system.

FIG. 4 is a diagram schematically showing a projection pattern by the projection optical system. Note that in this embodiment, 336 light control regions are provided for individually controlling the irradiation state of light. However, for convenience of explanation, in FIG. 4, only 35 light control regions in the vicinity of the central axis are shown by rectangles. The enlargement ratio of the projection pattern of each light control region becomes smaller in both the x direction and the y direction of the diagram as the region is closer to the central axis, and the enlargement ratio becomes larger in both the x direction and the y direction of the diagram as the region is farther from the central axis and closer to the periphery portion, and light is projected according to this enlargement ratio.

For example, as shown on the upper left side of the diagram, assume that each region corresponding to each light control region in image 40 (refer to FIG. 3) formed by the liquid crystal element 3 is a square of the same size. Then, the size (width) of each light control region of the projection pattern 41 (refer to FIG. 3) formed by the image 40 made incident on the projection optical system 6 becomes relatively smaller in the vicinity of the central axis in both the x direction and the y direction, and the size (width) of the region becomes relatively larger in the vicinity of the periphery portion. As a result, a finer light control can be achieved in the region closer to the central part of the projection pattern 41. Such a projection pattern is preferable as a light source being irradiated to the front space of the vehicle. It should be noted that the illustrated example is merely an example and the enlargement ratios in the x direction and the y direction are not limited thereto, and the shape of each light control region is not limited to a square or a rectangle.

The high-low difference ratio of the light illuminance of the projection pattern 41 formed by the projection optical system 6 is larger than that of the light incident to the liquid crystal element 3 formed by the incident optical system 2 which is relatively a flat illuminance distribution. The phrase "high-low difference ratio of the light illuminance" stated here can be expressed as, for example, the ratio of the maximum illuminance to the minimum illuminance. That is, since the illuminance distribution is determined according to the lens curvature distribution (lens enlargement ratio), the illuminance difference between the central portion and the peripheral portion of the projection pattern 41 is increased. Such a projection pattern is preferable as the illuminance distribution of the light irradiated to the front space of the vehicle.

According to the above-described embodiment, by making the incident light uniform, it is possible to form a light distribution pattern having an illuminance distribution of light desirable for a vehicular lamp while reducing the temperature bias of the liquid crystal element.

It should be noted that this invention is not limited to the subject matter of the foregoing embodiment, and can be implemented by being variously modified within the scope of the present invention as defined by the appended claims. For example, since it is preferable that the illuminance distribution of incident light to the liquid crystal element 3 be as uniform as possible, a combination of a rod lens and a telecentric optical system (telecentric lens) may be used in the incident optical system 2. Thereby, the illuminance distribution of incident light to the liquid crystal element can be made more uniform.

Further, in the above-described embodiment, a vehicular lamp system using a liquid crystal element for performing selective light irradiation according to the position of a vehicle or the like existing in front of the own vehicle has been described, but the scope of the present invention is not limited thereto. For example, the present invention may be applied to a vehicular lamp system used for an Adaptive Front-lighting System (AFS) that irradiates light in the direction the vehicle (the driver) intends to travel. Also, for example, the present invention may be applied to a vehicular lamp system that irradiates a marking beam in the direction in which a pedestrian or the like exists in order to notify the driver of the pedestrian or the like in front of the vehicle.

Further, in the above-described embodiment, as an example of the projection optical system 6, a single plane concave lens (plano-concave lens) is cited, but the lens used in the projection optical system 6 is not limited to a single plane concave lens, but a single plane convex lens, a biconvex lens, a biconcave lens, a concave mirror, a convex mirror and the like can be used.

Figure 5:
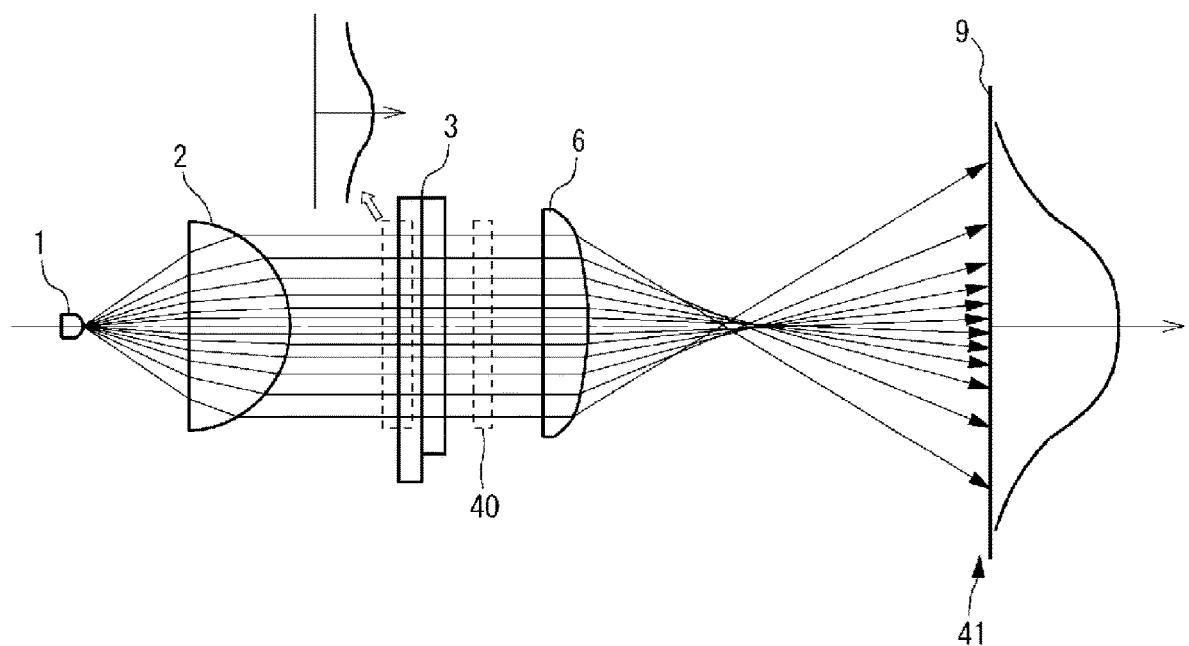
FIG. 5 is a diagram showing a configuration of a modified example of the vehicular lamp system.

FIG. 5 is a diagram for explaining a configuration of a modified example in which a convex lens (a single plane convex lens) is used as the projection optical system. The convex lens of the projection optical system 6 is arranged so that the flat surface faces the liquid crystal element 3. The convex lens in this embodiment has a lens shape in which the curvature of the curved surface (refractive surface) facing the flat surface is relatively small in the vicinity of its central axis (the optical axis) and the curvature of the curved surface becomes relatively large as it is distant from the center and close to the peripheral portion. When the projection optical system 6 is configured using this convex lens, as shown in the diagram, the image emitted from the liquid crystal element 3 passes through the projection optical system 6 to form a focal point (light converging point), spreads out and is projected on the virtual screen thereafter. Since the focal distance of the refracting surface of the projection optical system 6 becomes longer as it is closer to the central axis and the focal distance becomes shorter as it is farther from the central axis, the light illuminance distribution on the virtual screen 9 becomes the same as that of the above-described embodiment.

Figure 6A:
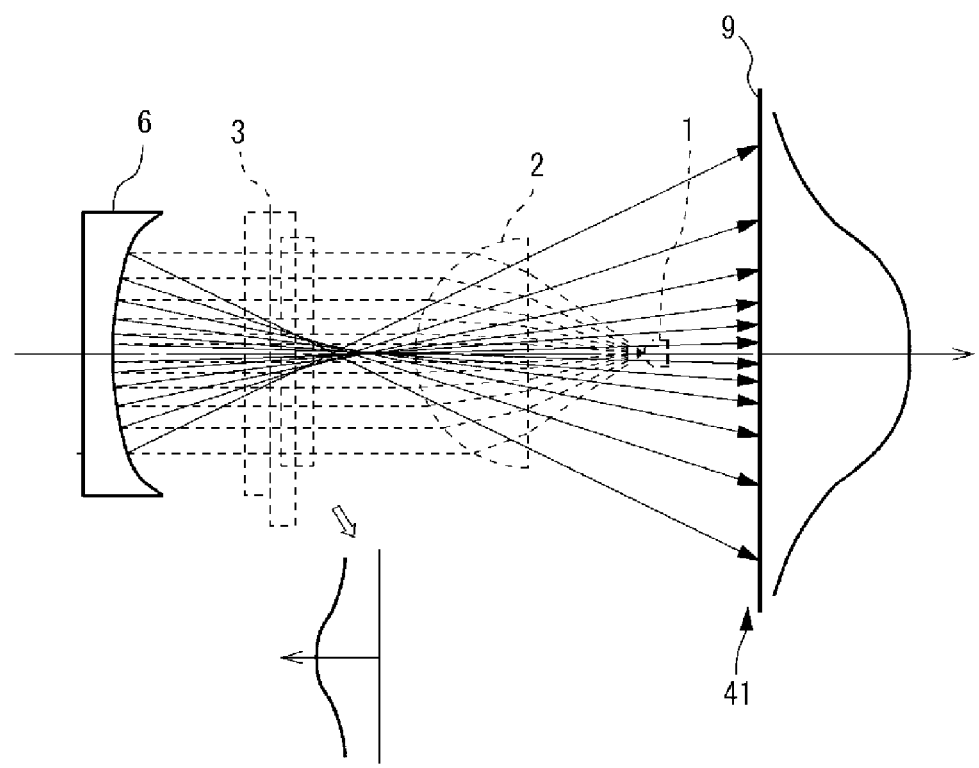
FIG. 6A and FIG. 6B are diagrams showing a configuration of another modified example of the vehicular lamp system.
Figure 6B:
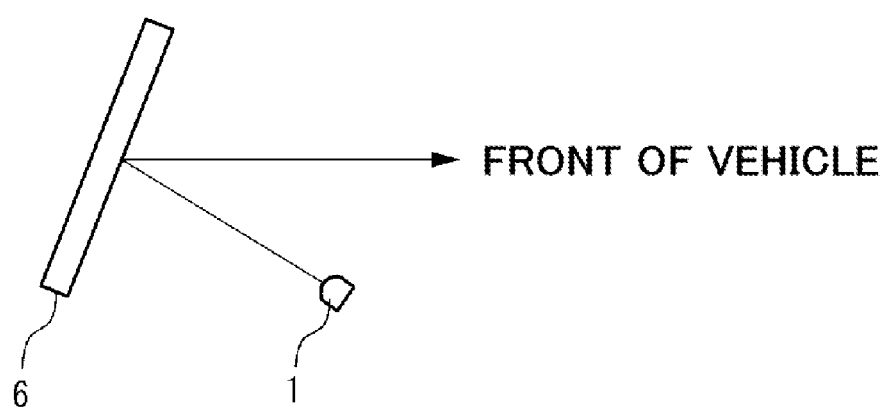

FIGS. 6A and 6B are diagrams for explaining a configuration of another modified example in which a concave mirror is used as the projection optical system. The concave mirror of the projection optical system 6 is arranged so that the reflecting surface faces the liquid crystal element 3. In this case, for example, the light source 1, the projection optical system 2, and the liquid crystal element 3 are disposed below the projection optical system 6 so that the image emitted from the liquid crystal element 3 can be made incident on the reflecting surface of the concave mirror as indicated by dotted lines in FIG. 6A. FIG. 6B is a diagram schematically showing this arrangement. For simplicity of explanation, only the light source 1 and the projection optical system 6 are shown. The concave mirror of the projection optical system 6 is disposed so that the reflecting surface thereof is inclined with respect to the vertical direction of the vehicle (corresponding to the vertical direction in the diagram) so that the reflected light advances toward the front space of the vehicle. The concave mirror has a shape in which the curvature of the reflecting surface is relatively small in the vicinity of its central axis (the optical axis) and the curvature of the reflecting surface becomes relatively large as it is distant from the center and close to the peripheral portion. When the projection optical system 6 is configured using this concave mirror, as shown in the diagram, the image emitted from the liquid crystal element 3 is reflected by the projection optical system 6 to form a focal point (light converging point), spreads out and is projected on the virtual screen thereafter. Since the focal distance of the reflecting surface of the projection optical system 6 becomes longer as it is closer to the central axis and the focal distance becomes shorter as it is farther from the central axis, the light illuminance distribution on the virtual screen 9 becomes the same as that of the above-described embodiment.

Figure 7:
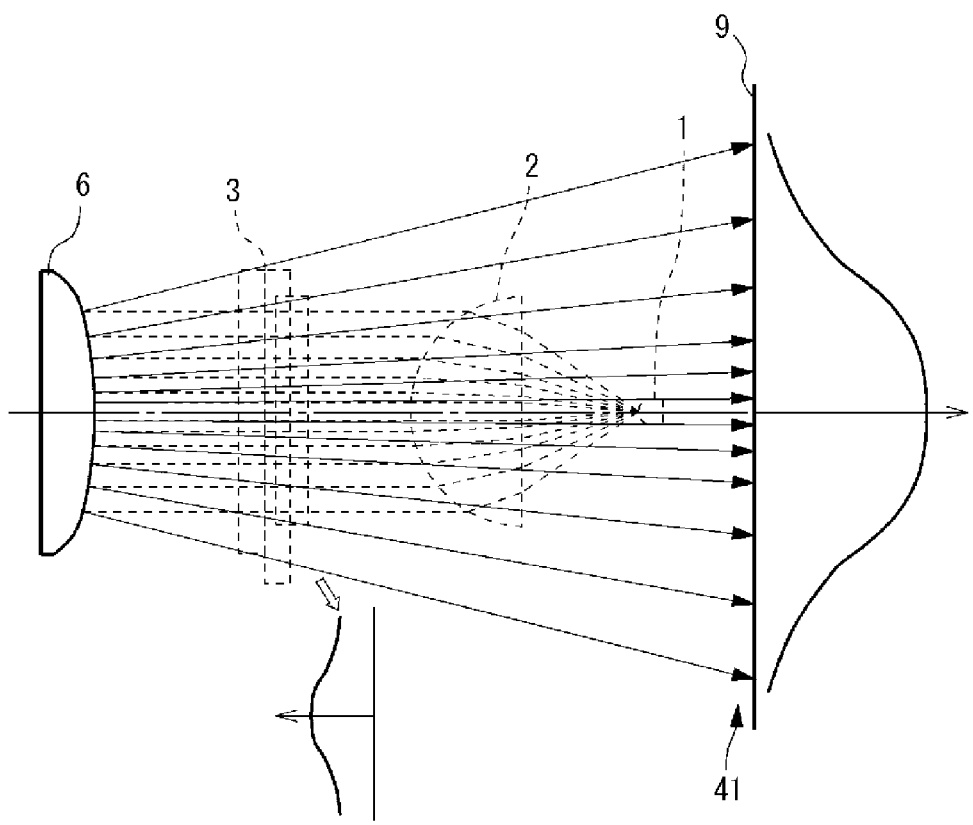
FIG. 7 is a diagram showing a configuration of another modified example of the vehicular lamp system.

FIG. 7 is a diagram for explaining a configuration of another modified example in which a convex mirror is used as the projection optical system. The convex mirror of the projection optical system 6 is arranged so that the reflecting surface faces the liquid crystal element 3. In this case, for example, the light source 1, the projection optical system 2, and the liquid crystal element 3 are disposed below the projection optical system 6 so that the image emitted from the liquid crystal element 3 can be made incident on the reflecting surface of the convex mirror as indicated by dotted lines in FIG. 7. Similar to the arrangement shown in FIG. 6B, the convex mirror of the projection optical system 6 is disposed so that the reflecting surface thereof is inclined with respect to the vertical direction of the vehicle (corresponding to the vertical direction in the figure) so that the reflected light advances toward the front space of the vehicle. The convex mirror has a shape in which the curvature of the reflecting surface is relatively small in the vicinity of its central axis (the optical axis) and the curvature of the reflecting surface becomes relatively large as it is distant from the center and close to the peripheral portion. When the projection optical system 6 is configured using this convex mirror, as shown in the diagram, the image emitted from the liquid crystal element 3 is reflected by the projection optical system 6, then spreads out and is projected on the virtual screen. Since the focal distance of the reflecting surface of the projection optical system 6 becomes longer as it is closer to the central axis and the focal distance becomes shorter as it is farther from the central axis, the illuminance distribution of the light on the virtual screen 9 becomes the same as that of the above-described embodiment.

Figure 8:
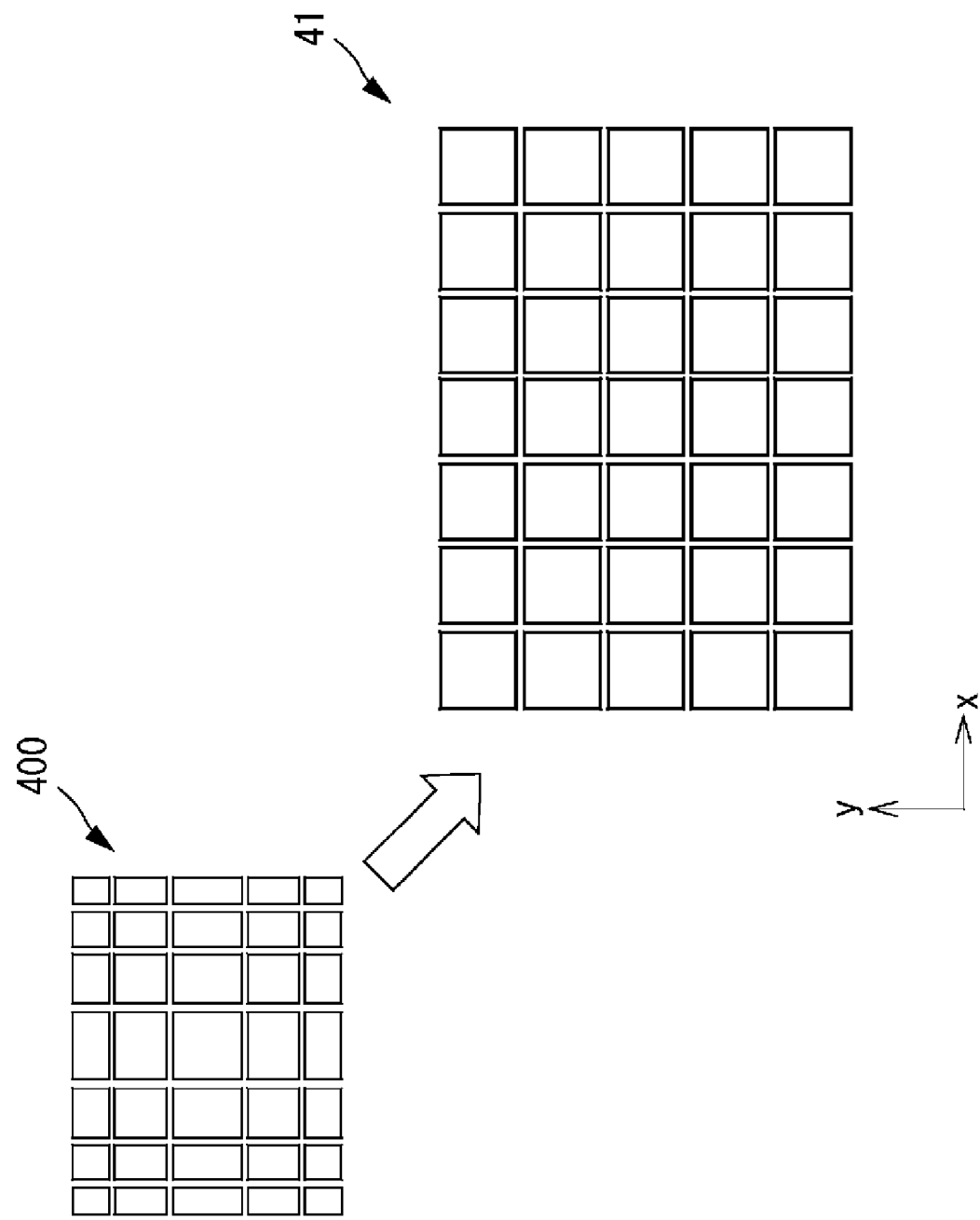
FIG. 8 is a diagram schematically showing the projection pattern by the projection optical system according to another embodiment.

Further, FIG. 8 is a diagram schematically showing the projection pattern by the projection optical system according to another embodiment. Note that in this embodiment, 336 light control regions are provided for individually controlling the irradiation state of light. However, for convenience of explanation, in FIG. 8, only 35 light control regions in the vicinity of the central axis are shown by rectangles. The enlargement ratio of the projection pattern of each light control region becomes smaller in both the x direction and the y direction of the diagram as the region is closer to the central axis, and the enlargement ratio becomes larger in both the x direction and the y direction of the diagram as the region is farther from the central axis and closer to the periphery portion, and light is projected according to this enlargement ratio.

Here, regarding pixel region group 400 in the liquid crystal element 3, the width (length) of the pixel region increases as it is closer to the central part (the position of the axis extended along the central axis) in both the x direction and the y direction and decreases as it becomes closer to the periphery. Here, each pixel region of pixel region group 400 in the liquid crystal element 3 is formed so that the width (length) of the pixel region increases in both the x direction and the y direction as it is closer to the central part (the position of the axis extended along the central axis) and decreases as it becomes closer to the periphery portion. Because of this, the image 40 (see FIG. 3) created by the liquid crystal element 3 is also formed so that its width (length) increases in both the x direction and the y direction as it is closer to the center part and decreases as it becomes closer to the periphery portion. Since the width of each light control region of the projection pattern 41 (see FIG. 3) formed by such image 40 entering the projection optical system 6 is increased as it is closer to the periphery in both the x direction and the y direction and hence the area of such light control region is increased, as shown in the diagram, each light control region can be made the same size (or be made nearly the same size). As a result, each light control region of the projection pattern 41 is formed to have the same width (in both the x direction and the y direction) and a light control in which the region closer to the central part is made to be brighter can be realized. It should be noted that the illustrated example is merely an example, and the enlargement ratios in the x direction and the y direction are not limited thereto, and the shape of each light control region is not limited to a square or a rectangle and not all of them may be exactly the same shape.

According to the above-described embodiment, by making the incident light uniform, it is possible to form a light distribution pattern having an illuminance distribution of light desirable for a vehicular lamp while reducing the temperature bias of the liquid crystal element.

Figure 9:
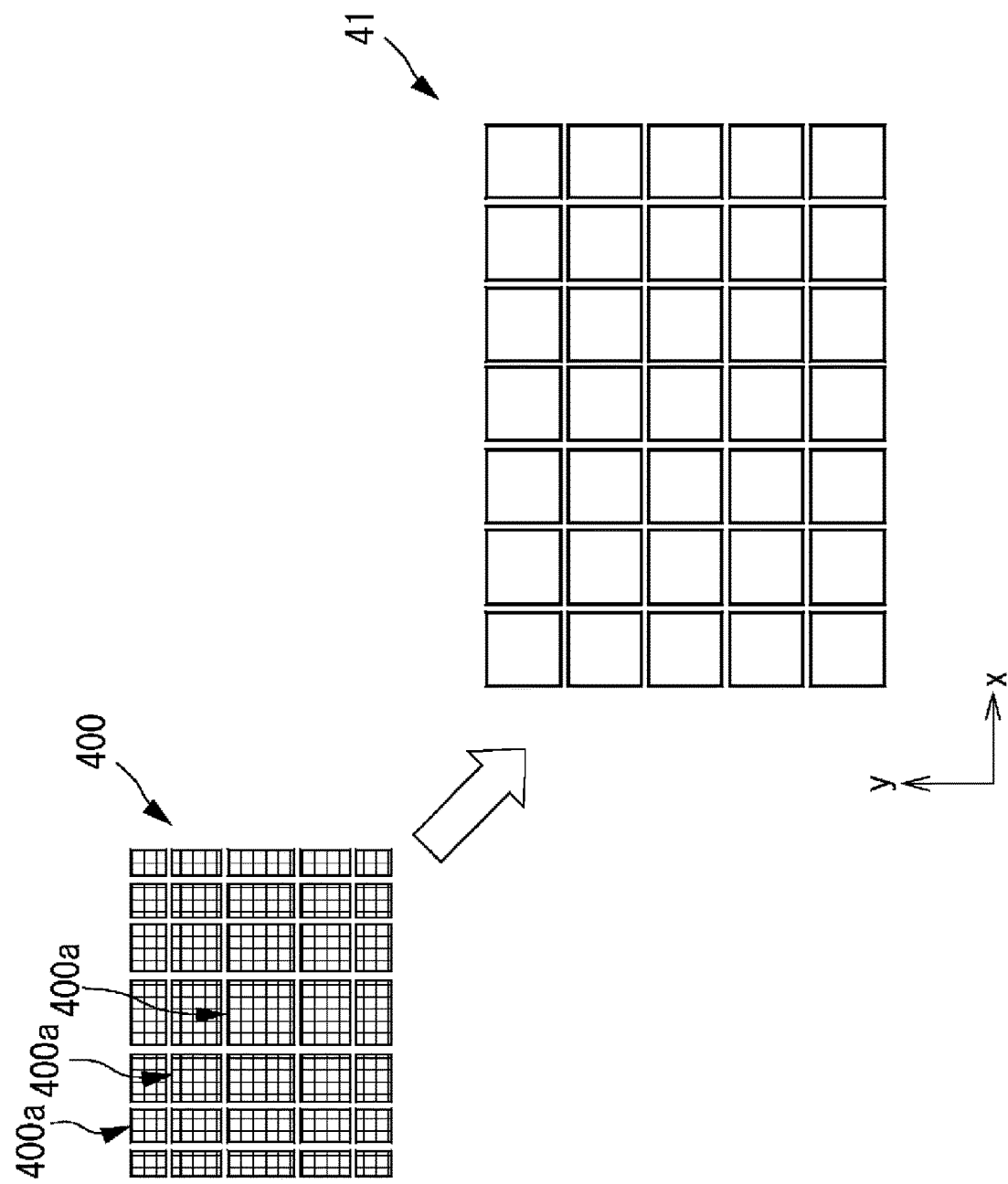
FIG. 9 is a diagram schematically showing a modified example of a projection pattern by the projection optical system.

Further, in the above-described embodiment, a case where one light control region and one pixel region are in one-to-one correspondence has been disclosed. However, as illustrated in FIG. 9, each pixel region of the liquid crystal element 3 may be modified to achieve a higher definition and thus the element may be driven under the condition where one light control region corresponds to a plurality of pixel regions.

Specifically, the liquid crystal element 3 may include 400 pixel regions in the up and down direction (vertical direction) and 1000 pixel regions in the left and right direction (horizontal direction) to form a total of 400,000 pixel regions and be driven individually, for example. In this case, for example, an active matrix type in which a thin film transistor is driven in association with each pixel region is preferable as a driving method, but is not limited thereto. In this case, as shown in the figure, in pixel region group 400, a plurality of pixel regions associated with each of the light control regions are grouped, and the pixel regions of each group 400a are synchronously driven so that these pixel regions belonging to each group 400a has substantially the same transmittance. That is, a plurality of pixel regions are associated with each region corresponding to each light control region in the image 40. Thereby, individual lighting control is realized for each light control region. In this case, each pixel region corresponding to each light control region may have the same shape (for example, a square) or may include a different shape. In such an embodiment, as shown in the figure, the groups 400a corresponding to the light control regions closer to the central part (the position of the axis extended along the central axis) of the light control regions of the projection pattern 41 correspond to pixel regions having a relatively large number of pixel regions, and the groups 400a corresponding to the light control regions distant from the central part and closer to the peripheral part correspond to pixel regions having a relatively small number of pixel regions. This pixel region arrangement corresponds to the enlargement ratio distribution of the projection optical system 6.

What is claimed is:

1. A vehicular lamp system capable of variably setting an irradiation pattern of light irradiated to the surroundings of an own vehicle comprising:
   a light source,
   a single plane convex lens for making uniform the intensity distribution of light from the light source,
   wherein the single plane convex lens has a focal point in a vicinity of a light emission position of the light source, and
   wherein the convex surface of the single plane convex lens is configured to convert light emitted from the light source into parallel light,
   a liquid crystal element is configured to modulate light emitted from the single plane convex lens to form an image,
   a driving part configured to drive the liquid crystal element,
   a single plane concave lens configured to project the image formed by the liquid crystal element,
   wherein the single plane concave lens is arranged so that its flat surface faces the liquid crystal element,
   wherein the liquid crystal element is disposed between the single plane convex lens and the single plane concave lens,
   wherein the single plane concave lens has a lens shape in which a curvature of the curved surface is smaller in a vicinity of its central axis and the curvature of the curved surface becomes larger as it is distant from a center and closer to a peripheral portion,
   such that the image incident on a plane including the central axis is projected at a larger enlargement ratio as it is farther from the central axis,
   the single plane concave lens is configured to convert light incident on the lens from the light source so that light emitted from the convex surface becomes parallel light,
   an illuminance distribution of the light emitted from the convex surface is an illuminance distribution in which illuminance near a center of the light is higher than at a periphery of the light, and when compared with an illuminance distribution without the single plane concave lens, the illuminance distribution has little difference in elevation, the liquid crystal element includes a vertical alignment type liquid crystal layer and a pair of polarizing elements arranged in a crossed Nicol arrangement.

2. A vehicular lamp system capable of variably setting an irradiation pattern of light irradiated to the surroundings of an own vehicle comprising:

a light source, a single plane convex lens configured to make uniform the intensity distribution of light from the light source, wherein the single plane convex lens has a focal point in a vicinity of a light emission position of the light source, and wherein the convex surface of the single plane convex lens is configured to convert light emitted from the light source into parallel light, a liquid crystal element configured to modulate light emitted from the single plane convex lens to form an image, a driving part configured to drive the liquid crystal element, a reflecting surface configured to project the image formed by the liquid crystal element, wherein the reflecting surface is inclined with respect to a vertical direction of the vehicle and to face the liquid crystal element, wherein the liquid crystal element is disposed between the single plane convex lens and the reflecting surface, wherein the reflecting surface has a central axis and curvature of the reflecting surface becomes smaller when closer toward the central axis and the curvature becomes larger when farther away from the central axis, such that an image incident on a plane including the central axis is projected at a larger enlargement ratio as it is farther from the central axis, wherein the liquid crystal element has a plurality of pixel regions which is larger as it is closer to the central axis and is smaller as it is farther from the central axis, in each of x direction and y direction.

3. A vehicular lamp system capable of variably setting an irradiation pattern of light irradiated to the surroundings of an own vehicle comprising:

a light source, an incident optical system for making uniform the intensity distribution of light from the light source, a liquid crystal element for modulating light emitted from the incident optical system to form an image, a driving part for driving the liquid crystal element, and a projection optical system for projecting the image formed by the liquid crystal element, wherein the liquid crystal element is disposed between the incident optical system and the projection optical system, wherein the incident optical system is configured to convert the light from the light source such that a high-low illuminance difference is made smaller compared to the high-low illuminance difference of the light incident on the incident optical system where the illuminance near a center of the light is higher than at a periphery of the light, wherein the incident optical system is configured to convert the light into substantially parallel light, wherein the incident optical system is configured to make the converted incident into the liquid crystal element, wherein the projection optical system has a central axis in which the image incident on a plane including the central axis is projected at a larger enlargement ratio as it is farther from the central axis, and wherein the projection optical system is configured such that the extent of high-low ratio of the illuminance distribution of the light forms a projection pattern obtained by projecting the image and is made larger than a projection pattern of the light incident on the liquid crystal element.

4. The vehicular lamp system according to claim 3, wherein the liquid crystal element has a plurality of pixel regions which is larger as it is closer to the central axis and is smaller as it is farther from the central axis.

5. The vehicular lamp system according to claim 4, wherein the incident optical system is configured to include a single plane convex lens, and wherein the single plane convex lens is disposed so that the flat surface faces the light source, and the focal point of the single plane convex lens coincides with the light emission position of the light source.

6. The vehicular lamp system according to claim 4, wherein the first optical system includes a rod lens and a telecentric optical system.

7. The vehicular lamp system according to claim 4, wherein the second optical system includes a refracting surface or a reflecting surface in which the focal distance of the refracting surface or the reflecting surface becomes longer when closer toward the central axis and the focal distance becomes shorter when farther away from the central axis.

8. The vehicular lamp system according to claim 4, wherein the second optical system includes a refracting surface or a reflecting surface in which the curvature of the refractive surface or the reflecting surface becomes smaller when closer toward the central axis and the curvature becomes larger when farther away from the central axis.

9. The vehicular lamp system according to claim 4, further comprising a light distribution control part which sets a light distribution pattern according to an object existing around the own vehicle and controls the driving part to form the image corresponding to the light distribution pattern.

10. The vehicular lamp system according to claim 3, wherein the projection optical system includes a concave mirror or a convex mirror, wherein the concave mirror or the convex mirror is arranged so that the reflecting surface faces the liquid crystal element, and wherein the concave mirror or the convex mirror is disposed so that the reflecting surface thereof is inclined with respect to a vertical direction of the vehicle so that reflected light advances toward a front space of the vehicle.

11. The vehicular lamp system according to claim 10, wherein the reflecting surface of the concave mirror or the convex mirror has a surface shape in which a curvature of the curved surface is smaller in a vicinity of its optical axis and the curvature of the curved surface becomes larger as it is distant from a center and closer to a peripheral portion.

12. The vehicular lamp system according to claim 3, wherein the liquid crystal element has a plurality of pixel regions which is divided into a plurality of groups and the pixel regions of each group are synchronously driven, and wherein among the plurality of pixel regions, the number of the pixel regions which belong to the group closer to the position of the axis extended along the central axis is larger and the number of the pixel regions is smaller in the groups farther from the central axis.

13. The vehicular lamp system according to claim 3,
wherein the incident optical system is configured to include a single plane convex lens, and
wherein the single plane convex lens is disposed so that the flat surface faces the light source, and the focal point of the single plane convex lens coincides with the light emission position of the light source.

14. The vehicular lamp system according to claim 3,
wherein the first optical system includes a rod lens and a telecentric optical system.

15. The vehicular lamp system according to claim 3,
wherein the second optical system includes a refracting surface or a reflecting surface in which the focal distance of the refracting surface or the reflecting surface becomes longer when closer toward the central axis and the focal distance becomes shorter when farther away from the central axis.

16. The vehicular lamp system according to claim 3,
wherein the second optical system includes a refracting surface or a reflecting surface in which the curvature of the refractive surface or the reflecting surface becomes smaller when closer toward the central axis and the curvature becomes larger when farther away from the central axis.

17. The vehicular lamp system according to claim 3,
further comprising a light distribution control part which sets a light distribution pattern according to an object existing around the own vehicle and controls the driving part to form the image corresponding to the light distribution pattern.

18. The vehicular lamp system according to claim 3,
wherein the projection optical system includes a single plane concave lens,
wherein the single plane concave lens is arranged so that the flat surface faces the liquid crystal element, and
wherein the single plane concave lens has a lens shape in which a curvature of the curved surface is smaller in a vicinity of its central axis and the curvature of the curved surface becomes larger as it is distant from a center and closer to a peripheral portion.

* * * * *